United States Patent [19]

Bathelt

[11] 4,188,307
[45] Feb. 12, 1980

[54] MIXTURE WITH LOW SURFACE TENSION WHICH CONSISTS OF FLUORINATED ALKYLAMMONIUM MONOALKYL SULFATES AND FLUOROALKYL-SULFATOBETAINES

[75] Inventor: Heinrich Bathelt, Altotting, Fed. Rep. of Germany

[73] Assignee: Hoechst Aktiengesellschaft, Fed. Rep. of Germany

[21] Appl. No.: 956,750

[22] Filed: Nov. 1, 1978

[30] Foreign Application Priority Data

Nov. 4, 1977 [DE] Fed. Rep. of Germany ....... 2749330

[51] Int. Cl.$^2$ ............................................. B01F 17/04
[52] U.S. Cl. .............................. 252/355; 260/567.6 M
[58] Field of Search .................. 252/355; 260/567.6 F, 260/567.6 M, 501.12

[56] References Cited

U.S. PATENT DOCUMENTS

| | | | |
|---|---|---|---|
| 3,257,407 | 6/1966 | Brace ................................. | 252/357 X |
| 3,535,381 | 10/1970 | Hauptschein et al. ........... | 252/525 X |
| 3,773,826 | 11/1973 | Rondestvedt, Jr. ................ | 560/222 |
| 4,000,175 | 12/1976 | Foulletier et al. ........ | 260/567.6 M X |

*Primary Examiner*—E. Suzanne Parr
*Attorney, Agent, or Firm*—Connolly and Hutz

[57] ABSTRACT

Mixture with low surface tension, containing 10 to 80% by weight of at least one compound of the formula

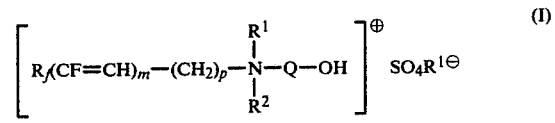

in which $R_f$ is perfluoroalkyl with 3 to 36 C atoms, $R^1$ is alkyl with 1 to 4 C atoms, $R^2$ is alkyl with 1 to 4 C atoms, cyclohexyl or 2-hydroxyalkyl with 2 to 4 C atoms, Q is —CH$_2$CH$_2$— or

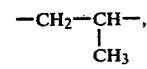

m is the number 0 or 1 and, if m is 0, p is an integer of from 1 to 4 and if m is 1, p is the number 1, and 90 to 20% by weight of at least one compound of the formula

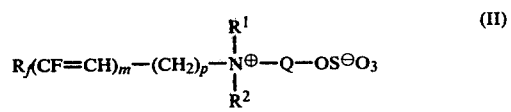

in which $R_f$, $R^1$, $R^2$, Q, m and p are as defined above.

5 Claims, No Drawings

MIXTURE WITH LOW SURFACE TENSION WHICH CONSISTS OF FLUORINATED ALKYLAMMONIUM MONOALKYL SULFATES AND FLUOROALKYL-SULFATOBETAINES

The invention relates to a mixture with low surface tension which consists of fluorinated alkylammonium monoalkyl sulfates and fluoroalkyl-sulfatobetaines.

Fluorine-containing alkylammonium salts of the general formula

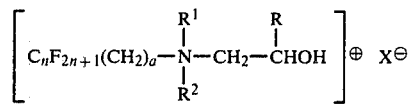

in which $C_nF_{2n+1}$ represents a straight-chain or branched perfluorinated chain, n represents a number between 1 and 20, a represents 2 or 4, R represents a hydrogen atom or a methyl radical, $R^1$ represents an alkyl radical with 1 to 9 C atoms, $R^2$ represents an alkyl radical with 1 to 8 C atoms or a radical of the formula —$CH_2$—CHOHR or a cycloalkyl radical with 5 to 9 C atoms or an aryl radical with 6 to 10 C atoms and $X^-$ is an anion, which can be a halide anion, a sulfate anion or an alkyl sulfate anion, are known. These compounds are said to be suitable as surface treatment agents, as emulsifiers when separating ores and also for the emulsification of hydrocarbons in aqueous solution. When adsorbed on diverse materials, they are said to impart oleophobic and hydrophobic properties to these materials.

Furthermore, compounds of the formula

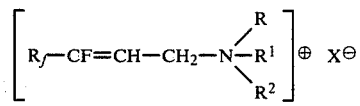

are known. In this formula $R_f$ denotes a perfluorinated alkyl radical, R denotes a lower alkyl radical, $R^1$ and $R^2$ denote alkyl radicals with 1 to 20 carbon atoms, including alicyclic radicals and straight-chain or branched-chain alphatic radicals, which can be monosubstituted or polysubstituted by aryl radicals with 6 to 10 C atoms, by hydroxyl radicals or alkoxy radicals with 1 to 10 C atoms or by radicals of primary or secondary amines with up to 10 C atoms, and $X^-$ is an anion of an acid, for example chloride or iodide, a sulfate anion $HSO_4^-$ or $SO_4^{2-}$, a phosphate anion or an acetate anion. These compounds are cationic surface-active substances and are recommended for purposes similar to those mentioned above.

Surprisingly, it has now been found that the lowering of the surface tension is substantially improved when compounds of the formula

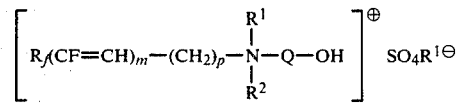 $SO_4R^{1\ominus}$ in which $R_f$ denotes a perfluoroalkyl radical with 3 to 16 C atoms, $R^1$ denotes an alkyl radical with 1 to 4 C atoms, $R^2$ denotes an alkyl radical with 1 to 4 C atoms, a cyclohexyl radical or a 2-hydroxyalkyl radical with 2 to 4 C atoms, Q denotes the alkylene radicals —$CH_2CH_2$— or —$CH_2CH(CH_3)$—, m denotes the number 0 or 1 and, if m is 0, p is an integer from 1 to 4 and, if m is 1, p is the number 1, are subjected to a heat treatment under specific conditions, mixtures being formed which have an advantageous activity when they contain 10 to 80% by weight, based on the mixture, of at least one compound of the abovementioned formula and 90 to 20% by weight, based on the mixture, of at least one compound of the formula

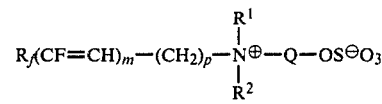

in which $R_f$, $R^1$, $R^2$, Q, m and p are as defined above.

Particularly good results are obtained when the mixture contains 20 to 75% by weight, based on the mixture, of at least one compound of the abovementioned formula (I) and 80 to 25% by weight, based on the mixture, of at least one compound of the abovementioned formula (II), the symbols $R_f$, $R^1$, $R^2$, Q, m and p in the formulae (I) and (II) being as defined above.

Because of their ready accessibility, coupled with good activity, preferred mixtures are those which contain at least one compound of the formula (I) and at least one compound of the formula (II), in which formulae: $R_f$ denotes a perfluoroalkyl radical with 5 to 12 C atoms, $R^1$ denotes an alkyl radical with 1 to 2 C atoms, $R^2$ denotes an alkyl radical with 1 to 2 C atoms, Q denotes a $$-CH_2-CH-$$
$$\phantom{-CH_2-}|$$
$$\phantom{-CH_2-}CH_3$$

radical or especially a —$CH_2CH_2$— radical, m denotes the number 0 or 1 and, if m is 0, p is an integer from 2 to 4 and, if m is 1, p is the number 1.

Particularly preferred mixtures are those which contain at least one compound of the formula (I) and one compound of the formula (II), in which $R_f$, $R^1$, $R^2$ and Q have the abovementioned meanings and preferred meanings and in which m is 1 and p is 1.

The fluorine-containing, quaternary alkylammonium salts of the formula (I) can be manufactured by reacting the corresponding aminoalcohols containing perfluoroalkyl groups with a dialkyl sulfate in which the alkyl can contain 1 to 4 C atoms, in accordance with the process described in German Offenlegungsschrift 2,021,829. The aminoalcohols containing perfluoroalkyl groups which are required for this process are obtained as described in German Offenlegungsschrift 2,141,542, U.S. Pat. No. 3,535,381, U.S. Pat. No. 3,773,826 and U.S. Pat. No. 3,257,407, it being necessary to modify the process of the last-mentioned patent specification in respect of the starting materials so that the required substituents $R^2$ and Q—OH on the nitrogen atom are obtained.

The quaternary ammonium salts, containing fluoroalkyl groups, of the general formula (I) are treated, according to the invention, at a temperature of about 20° to about 120° C. and under a pressure of about 1 to 1,000 mbars for about 0.3 to 6 hours. Below about 20° C., the reaction generally proceeds too slowly, so that economic considerations make the use of lower temperatures disadvantageous. At temperatures above 140° C., marked decomposition phenomena in the products are observed and mixtures containing substantial amounts of impurities are obtained. Preferably, temperatures of 40° to 120° C. and in particular of 40° to 100° C. are used. The treatment is preferably carried out for 0.5 to 3 hours and longer treatment times at the same temperatures result in the mixture having a higher content of the sulfatobetaine of the formula (II).

The pressure is advantageously kept the same as or lower than the pressure under which the alcohol of the formula $R^1OH$, in which $R^1$ has the same meaning as in the compound of the formula (I) used for the treatment, boils at the treatment temperature chosen.

Provision must be made for good mixing and good heat transfer during the heat treatment. If necessary, the gaseous products formed during the treatment can be removed by means of a stream of inert gas, for example a stream of air or nitrogen, which is passed through or over the material to be treated or with which the material to be treated is kept in motion. Examples of apparatuses suitable for carrying out the heat treatment according to the invention are: temperature-controllable vessels with stirrers or equipment which agitates the material to be treated, such as stirred kettles, paddle mixers or rotary drums with paddles, and also temperature-controllable kneaders, such as twinscrew kneaders and so-called "Aachener kneaders" (AMK extrusion kneaders from Messrs. Peter Küpper, Aachen; compare Ullmann, 4th edition, 1972, volume 2, page 293), and also mills, such as, for example, ball mills, in which case a device for applying a partial vacuum must be provided.

After the heat treatment, the mixture, according to the invention, which has formed is cooled and can be used without further purification, if appropriate after comminution, dissolving or dispersing, for very diverse purposes, and further substances can be mixed in if desired.

Preferably, the heat treatment, according to the invention, of the compounds of the formula (I), is carried out on the undiluted substance, but it is also possible to treat solutions of the said compound, for example in aliphatic alcohols with 1 to 4 C atoms, for example methanol, ethanol, n-propanol or isopropanol. If these solutions are concentrated under the indicated reaction conditions, for formation of the mixture according to the invention already partly takes place in the solution and can subsequently be brought to completion by drying the reaction mixture.

Advantageously, when carrying out the heat treatment of a compound of the formula (I) on the undiluted substance, the progressive formation of the compound of the formula (II) can be followed by determining the amount of the compound $R^1OH$, in which $R^1$ is as defined in formula (I), which is split off and can be ended at the desired point in time. The amount of the compound $R^1OH$ which is split off is ascertained, for example, by condensing it out from a stream of inert gas, for example air or nitrogen, and weighing the condensate, or by determination by gas chromatography.

The determination of the content of the compound of the formula (II) in the mixture formed is appropriately carried out by separating this compound from the compound of the formula (I) by column chromatography, as follows:

A vertical glass tube with an internal diameter of 30 mm is closed at its lower end by a glass frit. The tube is filled to a height of 130 mm with about 30 g of a silica gel which has a grain size of 0.1 to 0.2 mm, and contains about 6% of water (for example of type MN from Messrs. Macherey und Nagel). 200 to 500 mg of the mixture to be determined are weighed out, as the sample, and dissolved in 5 ml of analytical grade methanol and the solution is introduced into the column filled with silica gel and then rinsed with further analytical grade methanol. The first 150 ml of methanolic solution which issue from the bottom of the column are collected and evaporated to dryness and the residue is again taken up in methanol and filtered through a glass frit, which has been covered with filter flock composition. The filtrate is evaporated and dried for 60 minutes at 105° C. in air. The product thus obtained represents virtually the total amount of the compound of the formula (II) contained in the sample. The content of the compound of the formula (II) in the sample can be determined by weighing out. A check on, or identification of, the purified compound of the formula (II) thus obtained is appropriately carried out by means of IR or NMR spectra, by means of thin layer chromatography or by elementary analysis.

Comparison substances of the formula (II), which are required for the abovementioned analytical methods, can be manufactured by the process of German Patent Application P 27 49 329.4, by reacting the corresponding tertiary, fluorine-containing alkylethanolamines with sulfating agents, such as chlorosulfonic acid or gaseous sulfur trioxide, neutralizing and reacting the neutral mixture with alkylating agents such as alkyl halides or dimethyl sulfate.

A suitable procedure for purity control or identification by thin layer chromatography is, for example, the following:

A commercially available silica gel 60 $F_{254}$ ready-to-use plate from Messrs. Merck is used as the static phase and analytical grade methanol is used as the mobile phase. 2 to 5 $\mu$l of a 2% strength by weight solution are applied as the sample, the length of run is 150 mm and the time of development is about 1 to 2 hours. Dragendorff reagent is used for developing. The $R_f$ values measured are 0.5 to 0.6 for a compound of the formula (II) and <0.1 for a compound of the formula (I).

Compared with the individual components (compounds of the formula I and II), the mixtures according to the invention have distinctly improved surface-active properties. The mixtures can be obtained in virtually 100% yield without any special technical effort. As well as by their high surface activity, the mixtures are distinguished by their compatibility with cationic and nonionic surface-active agents. They are suitable for use in the manufacture of polytetrafluoroethylene dispersions, especially of dispersions of polytetrafluoroethylene with low or medium molecular weight (so-called polytetrafluoroethylene waxes), as flow control agents for waxes, as cleaning assistants in drycleaning and also, in particular, as mixing components in fire extinguishing substances.

The examples which follow are intended to illustrate the invention in more detail:

EXAMPLE 1

50 g of an 80% strength by weight solution of $$[C_7F_{15}CF=CH-CH_2-N(CH_3)_2C_2H_4OH]^{\oplus} SO_4CH_3^{\ominus}$$

in isopropanol are freed from the solvent in a 250 ml glass flask in a rotary evaporator under about 480 mbars and at a temperature of 60° C. After 20 minutes, all the solvent has distilled off. The pressure is now reduced to about 23 mbars and the product—a colorless, loose powder—is rotated for a further 90 minutes in the rotary evaporator, at a bath temperature of 60° C.

This gives 39.4 g of a colorless solid, which is separated by column chromatography, as described further above, in order to determine the content of sulfatobetaine (formula II) which has been produced. The solid contains 61% by weight, based on the mixture, of the sulfatobetaine of the formula $$C_7F_{15}CF=CH-CH_2-N^{\oplus}(CH_3)_2C_2H_4OS^{\ominus}O_3.$$

The surface tensions of aqueous solutions of this product mixture are given in Table 1. Elementary analysis of the sulfatobetaine separated off by chromatography gives the following values (theoretical values in brackets): C 27.9% (28.4%); H 2.1% (2.2%); N 2.4% (2.4%); S 5.2% (5.4%);

The following NMR spectrum was determined:
$^1$H-NMR spectrum in D$_3$COD (using tetramethylsilane as the internal standard)

| | |
|---|---|
| $-CF=CH-CH_2-\overset{\oplus}{N}\equiv$ | 6.43 ppm (1 H) $J_{FCCH} = 31$ Hz<br>$J_{HCCH} = 8$ Hz |
| $-CF=CH-CH_2-\overset{\oplus}{N}\equiv$ | 4.46 ppm (2 H) $J_{HCCH} = 8$ Hz |
| $CH_3-$ | 3.34 ppm (6 H) |
| $\equiv\overset{\oplus}{N}-CH_2-CH_2-O-$ | 3.64 ppm (2 H) $J_{HCCH} = 5$ Hz |
| $\equiv\overset{\oplus}{N}-CH_2-CH_2-O-$ | 4.06 ppm (2 H) $J_{HCCH} = 5$ Hz |

(1 ppm = 60 Hz)

EXAMPLE 2

50 g of an 80% strength by weight solution of $$\left[C_7F_{15}CF=CH-CH_2-\underset{\underset{CH_3}{|}}{\overset{\overset{CH_3}{|}}{N}}-C_2H_4OH\right]^{\oplus} SO_4CH_3^{\ominus}$$

in isopropanol are freed from the solvent under the same conditions are indicated in Example 1. However, the dry product is rotated in a rotary evaporator for 150 minutes at a bath temperature of 60° C. and under a vacuum of about 23 mbars.

The sulfatobetaine (formula II) content determined by column chromatography is 79% by weight, based on the mixture.

See Table 1 for the surface tension.

EXAMPLE 3

50 g of an 80% strength by weight solution of $$[C_7F_{15}CF=CH-CH_2N(CH_3)_2C_2H_4OH]^{\oplus}SO_4CH_3^{\ominus}$$

in isopropanol are freed from the solvent under the same conditions as indicated in Example 1. However, the dried product is rotated in a rotary evaporator for 60 minutes at a bath temperature of 80° C. and under a vacuum of 23 mbars.

The sulfatobetaine (formula II) content determined by column chromatography is 59% by weight, based on the mixture.

See Table 1 for the surface tension.

EXAMPLE 4

50 g of an 80% strength by weight solution of $$[C_7F_{15}CF=CH-CH_2N(CH_3)_2C_2H_4OH]^{\oplus}SO_4CH_3^{\ominus}$$

in isopropanol are freed from the solvent as indicated in Example 1. The dry product is heated, with a rotary motion, in a rotary evaporator for 150 minutes at a bath temperature of 70° C. and under a vacuum of 23 mbars.

The sulfatobetaine (formula II) content determined by column chromatography is 75% by weight, based on the mixture.

See Table 1 for the surface tension.

EXAMPLE 5

160 g of an amine mixture consisting of 41% by weight of $C_5F_{11}CF=CH-CH_2N(CH_3)C_2H_4OH$, 35% by weight of $C_7F_{15}CF=CH-CH_2N(CH_3)C_2H_4OH$, 19% by weight of $C_9F_{19}CF=CH-CH_2N(CH_3)C_2H_4OH$ and 5% by weight of $C_{11}F_{23}CF=CH-CH_2N(CH_3)C_2H_4OH$ are initially introduced, together with 160 g of isopropanol, into a 1 l glass flask fitted with a stirring device and a reflux condenser. An equimolar amount (42.5 g) of dimethyl sulfate is added in the course of half an hour at about 60° C. and the reaction mixture is then boiled for 4 hours under reflux.

The resulting reaction mixture, which is a clear, brown colored solution, is then freed from the solvent in a rotary evaporator at about 50° to 60° C. under about 470 mbars. The dry residue is agitated in the rotary evaporator for 2 hours at a bath temperature of 80° C. and under a vacuum of about 21 to 24 mbars.

The separation of the product mixture by column chromatography gives a value of 60% by weight, based on the mixture, for the sulfatobetaines of the formula (II) formed.

The surface tensions of aqueous solutions of this product mixture are given in Table 1.

EXAMPLE 6

474.5 g of an amine mixture of the following composition: 41% by weight of $C_5F_{11}CF=CH-CH_2N(CH_3)C_2H_4OH$, 35% by weight of $C_7F_{15}CF=CH-CH_2N(CH_3)C_2H_4OH$, 19% by weight of $C_9F_{19}CF=CH-CH_2N(CH_3)C_2H_4OH$ and 5% by weight of $C_{11}F_{23}CF=CH-CH_2N(CH_3)C_2H_4OH$, are initially introduced into a heatable laboratory kneader of about 1 l capacity (Messrs Janke und Kunkel, Staufen/Breisgau, Beken type) and heated to 50° C. and, after switching on the stirrer, 126 g of dimethyl sulfate are then added in the course of 30 minutes. The product is then warmed to 80° C., a vacuum of 27 mbars is applied to the mixing space of the kneader and the pulverulent product is mixed at the indicated temperature for 90 minutes.

This gives 591 g of a pale yellow, pulverulent solid which is subjected to separation by column chromatography in order to determine the content of sulfatobetaine which has been produced. 24% by weight, based on the total mixture, of resulting sulfatobetaines of the formula II are found.

The surface tensions of aqueous solutions of this product mixture are listed in Table 1.

$^1$H-NMR spectrum in CD$_3$OD (using tetramethylsilane as the internal standard, data according to the δ scale):

Table 1

| Product | Content in % by weight | | Surface tensions in water at 20° C. in [mN/m], concentration of the solution: | | | | |
|---|---|---|---|---|---|---|---|
| | Sulfatobetaine of the formula (II) | Quaternary salt of the formula (I) | 5 g/l | 1 g/l | 0.3 g/l | 0.1 g/l | 0.03 g/l |
| Example 1 | 61 | 39 | 17.4 | 17.6 | 19.4 | 17.6 | 24.7 |
| Example 2 | 79 | 21 | 18.3 | 17.5 | 17.5 | 19.7 | 20.9 |
| Example 3 | 59 | 41 | 17.7 | 17.3 | 18.1 | 17.9 | 18.1 |
| Example 4 | 75 | 25 | 18.4 | 18.0 | 18.8 | 20.4 | 23.4 |
| Example 5 | 60 | 40 | — | 18.5 | 19.0 | 21.5 | 24.4 |
| Example 6 | 24 | 76 | — | — | 18.6 | 18.7 | 28.3 |
| Comparison a | 100 | 0 | — | 22.4 | 42.7 | 50.9 | 64.7 |
| Comparison b | 0 | 100 | — | 23.6 | 28.4 | 39.2 | 53.0 |
| Comparison c | 0 | 100 | — | 27.6 | 32.0 | 45.1 | 59.7 |
| Comparison d | 0 | 100 | — | 22.0 | 35.0 | 46.0 | 56.0 |

Comparison a = a mixture of compounds of the formula
$$R_fCF=CHCH_2\overset{\oplus}{N}(CH_3)_2C_2H_4OSO_3^{\ominus}$$

Comparison b = a mixture of compounds of the formula
$$[R_fCF=CHCH_2N(CH_3)_2C_2H_4OH]^+ SO_4CH_3^-$$

Comparison c = a commercially available product of the formula
$$[R_fCH_2CH_2SCH_2CH_2N(CH_3)_3]^+ SO_4CH_3^-$$

Comparison d = a commercially available product of the formula

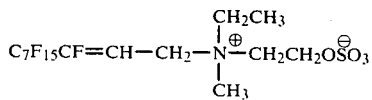

in which $R_f$ is a mixture of perfluorinated alkyls of the following formulae (proportion in % by weight, based on the starting amine mixture) 41% by weight of $C_5F_{11}$—, 35% by weight of $C_7F_{15}$—, 19% by weight of $C_9F_{19}$—and 5% by weight of $C_{11}F_{23}$— $R_f$ is a perfluorinated alkyl radical with an average chain length of about 8 C atoms. precise composition not known

EXAMPLE 7

100 g of a 50% strength by weight solution in methanol of

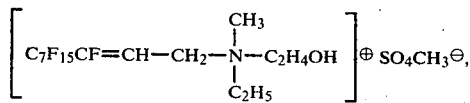

which have been prepared from $$C_7F_{15}CF=CH-CH_2-N-C_2H_4OH$$
$$\qquad\qquad\qquad\qquad\quad |$$
$$\qquad\qquad\qquad\qquad\quad C_2H_5$$

by quaternization with dimethyl sulfate, are freed from the solvent under the reaction conditions indicated in Example 1.

The resulting solid product is then mixed in a rotary evaporator at 60° C. and under a vacuum of 23 mbars for 90 minutes. This gives 47.5 g of a colorless powder which, according to separation by column chromatography, has a content of 35% by weight, based on the mixture, of the sulfatobetaine of the formula (II) which has formed.

The following nuclear magnetic resonance spectrum is determined for this purified betaine of the formula

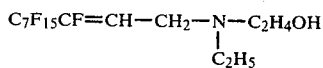

| | |
|---|---|
| —CF=CH—CH$_2$—$\overset{\oplus}{N}$≡ | 6.43 ppm (1 H) $J_{FCCH}$ = 31 Hz; $J_{HCCH}$ = 8 Hz; |
| —CF=CH—CH$_2$—$\overset{\oplus}{N}$≡ | 4.46 ppm (2 H) $J_{HCCH}$ = 8 Hz; |
| CH$_3$—CH$_2$—$\overset{\oplus}{N}$≡ | 3.54 ppm (2 H) $J_{HCCH}$ = 7 Hz; |
| CH$_3$—CH$_2$—$\overset{\oplus}{N}$≡ | 1.41 ppm (3 H) $J_{HCCH}$ = 7 Hz; |
| ≡$\overset{\oplus}{N}$—CH$_2$—CH$_2$—O— | 3.64 ppm (2 H) $J_{HCCH}$ = 5 Hz; |
| ≡$\overset{\oplus}{N}$—CH$_2$—CH$_2$—$\overset{\ominus}{O}$SO$_3$ | 4.06 ppm (2 H) $J_{HCCH}$ = 5 Hz; |
| CH$_3$—$\overset{\oplus}{N}$≡ | 3.34 ppm (3 H) |
| (1 ppm = 60 Hz) | |

$^{19}$F-NMR spectrum in CD$_3$OD (using trifluoroacetic acid as the external standard:

| | |
|---|---|
| CF$_3$— | 4.3 ppm |
| —CF$_2$—CF=CH— | 40.3 ppm |
| —CF$_2$—CF=CH— | 41.6 ppm |
| CF$_3$—CF$_2$— | 49.0 ppm |
| CF$_3$—CF$_2$(CF$_2$)$_3$— | 44.9 ppm |

EXAMPLE 8

20 g of a compound of the formula

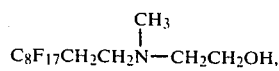

which has been prepared analogously to Example 15 of U.S. Pat. No. 3,773,826 from the p-toluenesulfonyl ester of C$_8$F$_{17}$CH$_2$CH$_2$OH by reaction with methylethanolamine, are converted in diethyl ether with equimolar amounts of dimethyl sulfate into the quaternary methosulfate of the formula $$[C_8F_{17}CH_2CH_2N(CH_3)_2C_2H_4OH]^{\oplus}SO_4CH_3^{\ominus}$$

Heating the product to 70° C. in a rotary evaporator under a vacuum of 24 mbars produces, in the course of 2 hours, a mixture which, according to separation by column chromatography, contains 70% by weight, based on the mixture, of a compound of the formula

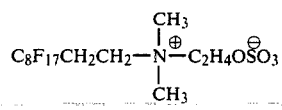

EXAMPLE 9

As described in Example 8, a compound of the formula

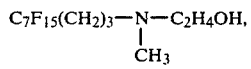

is prepared according to Example 15 of U.S. Pat. No. 3,773,826. The amine is then converted in diethyl ether with equimolar amounts of dimethyl sulfate into the quaternary methosulfate of the formula

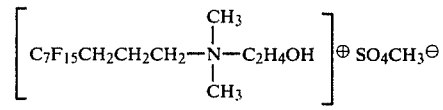

Heating the product to 70° C. in a rotary evaporator under about 24 mbars gives, in the course of 2 hours, a mixture which, according to separation by column chromatography, contains 70% by weight, based on the mixture, of a compound of the formula

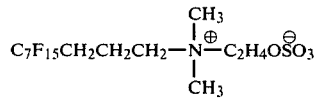

and has the following NMR spectrum:

$^1$H-NMR spectrum: measured in CD$_3$OD (using tetramethylsilane as the internal standard):

| | |
|---|---|
| $-CH_2-CH_2-CH_2-\overset{\oplus}{N}\equiv$ $-CH_2-CH_2-CH_2-\overset{\oplus}{N}\equiv$ | 2.2 ppm (4 H) |
| | 4.06 ppm (2 H) |
| $-(CH_2)_3-\overset{\oplus}{N}CH_2CH_2O\overset{\ominus}{S}O_3$ | |
| $=\overset{\oplus}{N}(CH_3)_2$ | 3.33 ppm (6 H) |
| 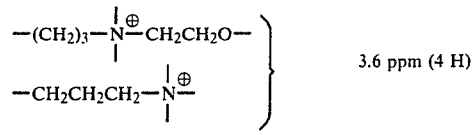 | 3.6 ppm (4 H) |

$^{19}$F-NMR spectrum in CD$_3$OD (using trifluoroacetic acid as the external standard):

| | |
|---|---|
| CF$_3$— | 3.4 ppm |
| —(CH$_2$)$_3$CF$_2$— | 35.8 ppm |
| —(CF$_2$)$_4$— | 44.0 ppm |
| CF$_3$—CF$_2$— | 48.1 ppm |

I claim:

1. Mixture with low surface tension, containing 10 to 80% by weight, based on the mixture, of at least one compound of the formula

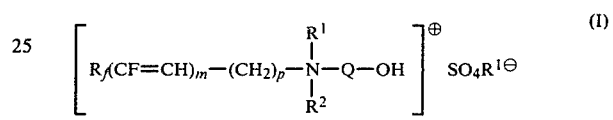

in which R$_f$ denotes a perfluoroalkyl radical with 3 to 16 C atoms, R$^1$ denotes an alkyl radical with 1 to 4 C atoms, R$^2$ denotes an alkyl radical with 1 to 4 C atoms, a cyclohexyl radical or a 2-hydroxyalkyl radical with 2 to 4 C atoms, Q denotes a —CH$_2$CH$_2$— or

radical, m denotes the number 0 or 1 and, if m is 0, p is an integer from 1 to 4 and if m is 1, p is the number 1, and 90 to 20% by weight, based on the mixture, of at least one compound of the formula

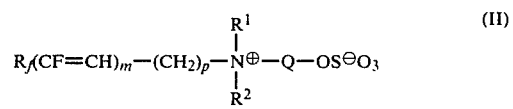

in which R$_f$, R$^1$, R$^2$, Q, m and p are as defined above.

2. Mixture as claimed in claim 1, containing 20 to 75% by weight, based on the mixture, of at least one compound of the formula (I), and 80 to 25% by weight, based on the mixture, of at least one compound of the formula (II), the symbols R$_f$, R$^1$, R$^2$, Q, m and p in the formulae (I) and (II) being as defined in claim 1.

3. Mixture as claimed in claims 1 or 2, wherein, in the formulae (I) and (II), R$_f$ denotes a perfluoroalkyl radical with 5 to 12 C atoms, R$^1$ denotes an alkyl radical with 1 to 2 C atoms, R$^2$ denotes an alkyl radical with 1 to 2 C atoms, Q denotes a —CH$_2$CH$_2$— radical or a

radical, m denotes the number 0 or 1 and, if m is 0, p is an integer from 2 to 4, and if m is 1, p is the number 1.

4. Process for the manufacture of a mixture as claimed in claim 1, which comprises treating at least one compound of the formula

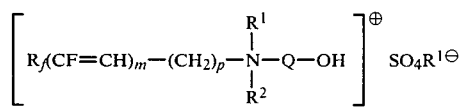

in which $R_f$, $R^1$, $R^2$, Q, m and p are as defined in claim 1, at a temperature of about 20° to 140° C. and under a pressure of 1 to 1,000 mbars for about 0.3 to 6 hours.

5. Process as claimed in claim 4, wherein the treatment is carried out at a temperature of 40° to 120° C. for 0.5 to 3 hours, the pressure being set so that it is the same as or lower than the pressure under which the alcohol $R^1OH$, in which the $R^1$ corresponds to the $R^1$ of the compound of the formula (I) employed, boils at the treatment temperature chosen.

* * * * *